Jan. 19, 1954   H. E. KIMES   2,666,470
TIRE TREAD AND APPARATUS FOR FORMING SAME

Filed Aug. 27, 1949   2 Sheets-Sheet 1

Inventor:
Harold E. Kimes
By Lee J. Gary
Attorney

Jan. 19, 1954   H. E. KIMES   2,666,470
TIRE TREAD AND APPARATUS FOR FORMING SAME
Filed Aug. 27, 1949   2 Sheets-Sheet 2
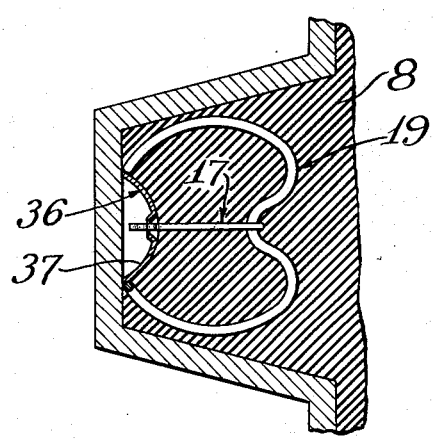
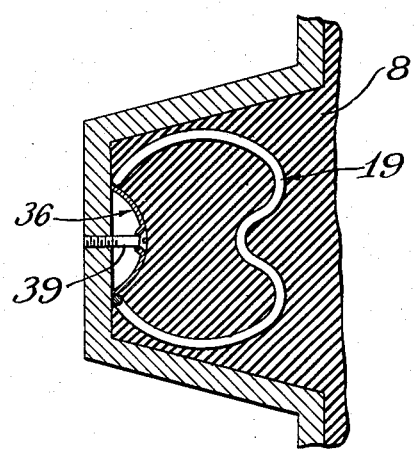
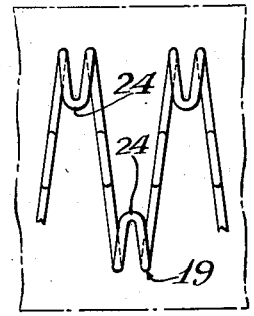
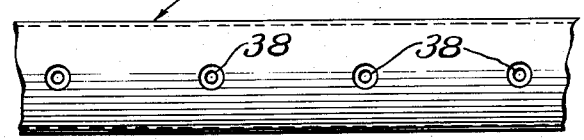
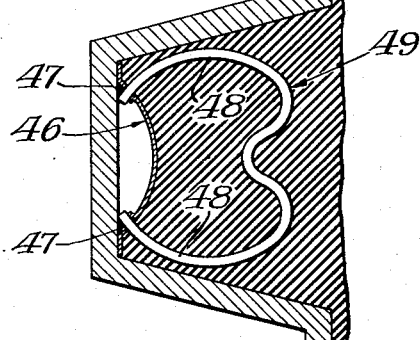
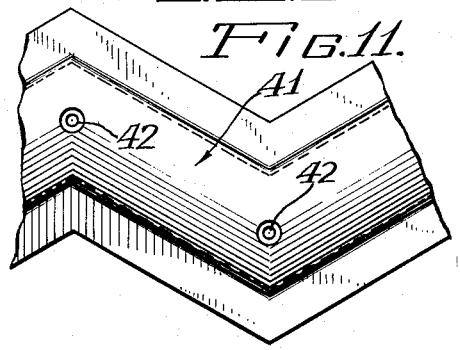
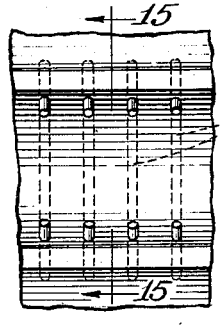
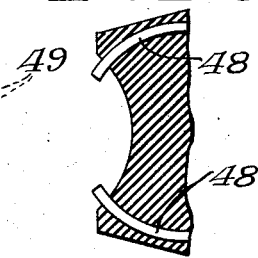
Inventor:
Harold E. Kimes
By Lee J. Gary
Attorney Patented Jan. 19, 1954

2,666,470

UNITED STATES PATENT OFFICE 2,666,470

TIRE TREAD AND APPARATUS FOR FORMING SAME

Harold E. Kimes, Chicago, Ill., assignor to Harold E. Kimes Corporation, Chicago, Ill., a corporation of Illinois Application August 27, 1949, Serial No. 112,711

12 Claims. (Cl. 152—211)

This invention relates to improvements in the tread portion of pneumatic tire casings and to apparatus for forming same.

This invention is more particularly concerned with the provision of a tread portion of a pneumatic tire casing embodying a plurality of metallic inserts formed and arranged to prevent punctures and skidding during use of the tire casing. Metallic inserts of the type hereinafter shown and described in connection with the present invention are shown and described in my co-pending patent application filed December 21, 1948, Serial No. 66,437, which has matured into Patent No. 2,600,506, patented June 17, 1952.

The present invention contemplates the provision of a tire tread embodying a plurality of U or W-shaped metallic inserts comprising a curvilinear base and a pair of arcuate arms extending radially and terminating at the outer surface of the tread to provide sharp fingers adapted to engage the surface of a road. The metallic inserts may be in the form of individual U-shaped members or may be in the form of a continuous chain of U-shaped members connected together at the outer ends of their arms.

This invention further contemplates the provision of means for mounting a chain of connected metallic inserts in proper alignment within a tire mold during molding of a tire tread.

This invention further contemplates the provision of guide and retaining means for positioning and holding metallic inserts in position within standard types of tire molds. This is accomplished by providing a matrix plate within the mold cavity to position the metallic inserts and by employing the use of metallic clips to secure the metallic inserts to the matrix plate. In one form of the invention hereinafter set forth, the matrix plate is secured within the mold cavity by means of screws, bolts or the like for use in successive tread molding operations. In another form of the invention hereinafter set forth the matrix plate serves to hold a group of individual inserts in predetermined spaced arrangement during the molding operation and is thereafter stripped from the tire tread and discarded.

This invention further contemplates the provision of a matrix plate adapted for use in tire mold cavities of different shapes.

This invention embodies other novel features, details of construction and arrangement of parts which are hereinafter set forth in the specification and claims, and illustrated in the accompanying drawings, wherein:

Fig. 8 is a fragmentary transverse sectional view of a tire mold illustrating a modified form of matrix plate.

Fig. 9 is a fragmentary sectional view, corresponding to Fig. 8, showing the means employed for securing the matrix plate to the tire mold.

Fig. 10 is a fragmentary detail plan view illustrating the construction of the matrix plate shown in Figs. 8 and 9.

Fig. 11 is a fragmentary view of the interior of a tire mold cavity illustrating the manner in which a matrix plate may be formed to suit the contour of a different mold cavity.

Fig. 12 is a fragmentary plan view illustrating the manner in which a chain of metallic inserts is arranged within the tread portion of a pneumatic tire casing.

Fig. 13 is a fragmentary sectional view of a tire mold illustrating another modified form of matrix plate for securing a group of individual metallic inserts in spaced arrangement, the matrix plate preferably being formed of relatively thin metal and stripped from the tire tread after the molding operation.

Fig. 14 is a fragmentary view illustrating the appearance of the outer surface of a tire tread when the latter is separated from the mold and matrix plate illustrated in Fig. 13.

Fig. 15 is a fragmentary sectional view taken along the line 15—15 of Fig. 14.

Figure 1:
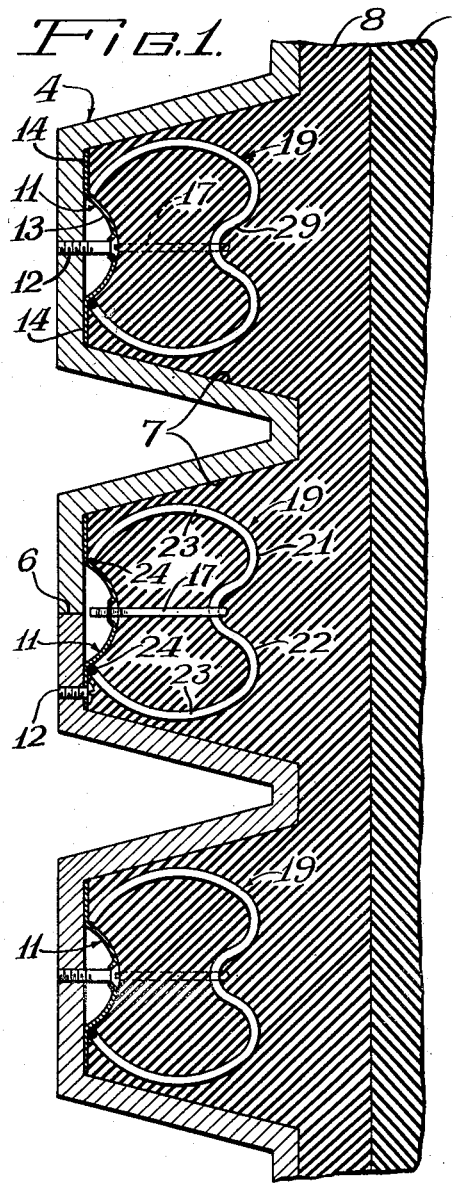
Fig. 1 is a fragmentary transverse sectional view illustrating the manner in which the metallic inserts are mounted and secured to matrix plates provided within the cavities of a clam-type tire mold.
Figure 2:
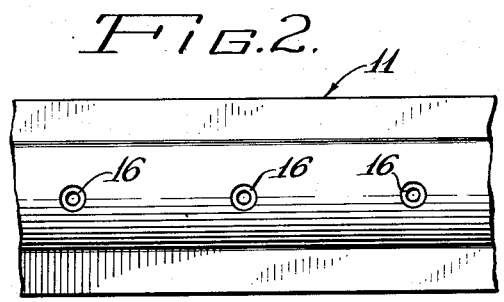
Fig. 2 is a fragmentary plan view illustrating one type of matrix plate.
Figure 3:
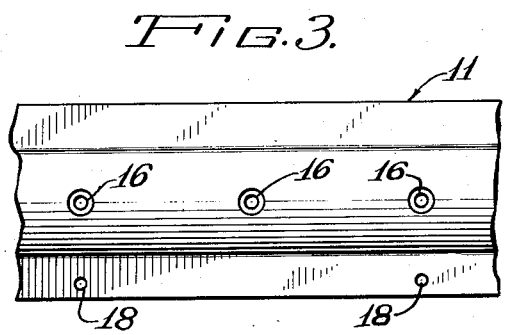
Fig. 3 is a fragmentary plan view illustrating the type of matrix plate provided within the central cavity of a clam-type tire mold.
Figure 7:
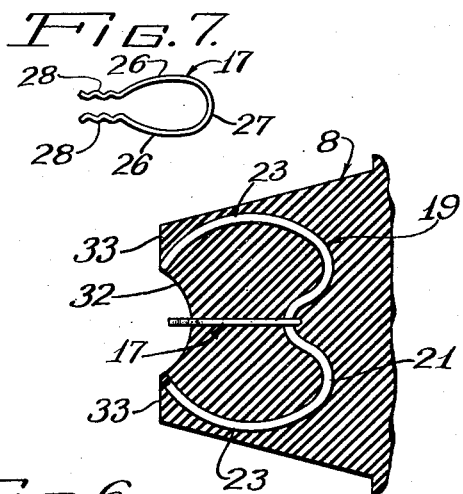
Fig. 7 is a detail view illustrating the type of clip employed for securing the metallic inserts to the matrix plates.

Referring now to the drawings for a better understanding of this invention, and more particularly to Figs. 1 to 6 therein, the tire tread and apparatus for forming same is shown as comprising a clamp-type mold 4 which is split medially at 6 and formed with a plurality of mold cavities 7 which serve to form the design in the tread portion 8 on a pneumatic tire casing 9. A matrix plate 11 is mounted within the inner surface of each mold cavity 7 by means of screws 12. Each matrix plate comprises a concavo-convex section 13 and side flanges 14—14. The matrix plates are each provided with a series of apertures 16 disposed at spaced intervals along the longitudinal axis of the plate to receive the mounting screws 12 and retaining clips 17. If desired, the holes for the mounting screws 12 may be provided along one or both flanges 14—14 of the matrix plates 11, as indicated at 18 in Fig. 3 of the drawings. In clam-type molds, it is contemplated that the matrix plates 11 shall extend completely around the mold cavities with their ends in abutting engagement. In three-sectional molding apparatus, the matrix plates will, of course, be in the form of three sections of metal, one section for each of the mold sections.

Prior to molding a tread portion 8 onto a tire casing 9, a chain of metallic inserts 19 are mounted within the mold cavities 7 in the manner illustrated in Fig. 1 of the drawings. The construction of the chain of metallic inserts 19 is described and claimed in my co-pending patent application Serial No. 66,437, filed December 21, 1948 now Patent No. 2,600,506, patented June 17, 1952. Briefly, each chain of metallic inserts 19 comprises a plurality of W-shaped clips 21, each clip 21 having a curvilinear base portion 22 and a pair of curvilinear legs 23—23 which are connected at their ends at 24 to the ends of the legs of adjacent clips. Each chain of metallic inserts 19 is preferably formed from resilient steel wire and then hardened to provide a relatively long service life and maximum frictional engagement with a road surface. When tire casings embodying this type of metallic insert are provided for use on aircraft, it is contemplated that the chain of metallic inserts 19 may be formed from bronze wire or from any metallic alloy which will reduce sparking during frictional engagement of the clips against a hard-surfaced road.

Figures 5, 6:
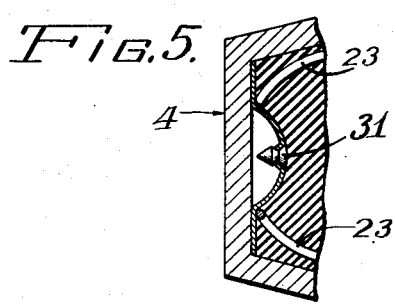
Fig. 5 is a fragmentary sectional view illustrating the manner in which some of the openings in the matrix plate are filled with rubber plugs prior to the molding operation.
Fig. 6 is a perspective view illustrating a rubber plug of the type adapted for use in filling open holes in the matrix plate.

Each chain of metallic inserts 19 is positioned within a mold cavity with the ends of the legs 23 of the W-shaped clips 21 engaged at the point of juncture between the flanges 14—14 and the concavo-convex section 13 of its matrix plate 11. The concavo-convex section 13 of a matrix plate 11 thus serves to properly position each of the W-shaped clips 21 in proper position within its mold cavity 7. The chain of connected inserts 19 is secured to its matrix plate 11 by means of wire clips 17 formed from lengths of resilient wire bent intermediate their ends to provide leg portions 26—26 and a connecting loop portion 27. The outer ends of the legs 26—26 are crimped at 28 to provide shoulders adapted to frictionally engage the marginal edges of their respective apertures 16. After a chain of metallic inserts 19 has been positioned against its matrix plate 11, the clips 17 are manually inserted into the apertures 16 with their loop portions 27 engaging the medial portion 29 of a W-shaped clip 21. In the event a clip 17 is not provided for each aperture 16, the unfilled apertures are adapted to be closed by means of rubber plugs 31, as illustrated in Figs. 5 and 6 in the drawings. The rubber plugs 31 are employed to prevent the flow of rubber through the apertures 16 during the molding operation. As the molding of tire treads on pneumatic tire casings is well known in this art, a description of the molding operation has been omitted.

Figure 4:
Fig. 4 is a fragmentary sectional view illustrating the contour of a finished tire tread and the manner in which a metallic insert and locking clip are arranged therein.

Fig. 4 in the drawings illustrates a section of a molded tire tread embodying a chain of metallic inserts 19 and the clips 17. It will be noted that the outer surface of the tread section is formed with a concave annular recess 32 and side shoulders 33—33. During the operation of this type of tire tread on a vehicle, it will be noted that the shoulder portions 33—33 will be compressed during engagement against the surface of a road and will cause the ends of the legs 23—23 of the W-shaped clips 21 to be pressed into engagement against the road surface. It is, of course, desirable that each W-shaped clip shall be separated from its adjacent clips immediately upon use of the tire casing. The immediate separation of the clips 21 from adjacent clips during operation of the tire casing may be accomplished by partially severing the wire at the points of juncture 24 of connected clips, or by flattening the juncture point 24 of connected clips, or by crystallizing the metal at the juncture 24 of connected clips during the hardening operation. It is important that the clips 21 shall be broken apart during the first few miles of travel of the tire casing in order to prevent heating due to excessive friction between the clips and the rubber tread.

Referring now more particularly to Figs. 8, 9 and 10 in the drawings, the matrix plate 36 is shown as comprising a strip of sheet metal bent concavo-convex to form a concave annular recess 37 in the surface of the tire tread 8. In this form of the invention, the side flanges are omitted from the matrix plate to effect a saving in material. The matrix plate 36 is formed along its longitudinal axis with a plurality of apertures 38 to receive mounting screws 39. The form of matrix plate shown in Figs. 8, 9 and 10 is particularly suitable for use in three-sectional tire molding machines. The chain of connected W-shaped clips 19 is adapted to be secured to the matrix plate 36 by means of the wire clips 17, as heretofore described in connection with the first form of the invention.

Fig. 11 illustrates another modified form of matrix plate 41 designed for use in a mold having a zigzag mold cavity. This type of matrix plate is otherwise similar to the matrix plate 11 illustrated in Fig. 1 in the drawings and is secured in position within a mold cavity by means of cap screws passing through the apertures 42. In mounting a continuous chain of metallic inserts 19 upon the matrix plate 41, it is contemplated that the operator will bend the chain of inserts to conform with the contour of the matrix plate and mold cavity.

Fig. 12 in the drawings illustrates in plan view the arrangement of a chain of metallic inserts 19 within the annular bead of a tire casing. As heretofore pointed out, it is contemplated that the junctures 24 between adjacent clips 21 are preferably weakened by partially cutting through the wire at these points, or by flattening the juncture points, in order that the chain of connected inserts shall be broken into a series of individual separate clips 21 immediately upon use of the tire casing.

Referring now more particularly to Figs. 13, 14 and 15 in the drawings, the matrix strip 46 is shown as comprising a concavo-convex strip of metal having apertures 47 formed along its side edges to receive the ends of the legs 48—48 of individual W-shaped resilient wire clips 49. The individual clips 49 are adapted to be mounted upon the flexible matrix strip 46 during manufacture of the clips. The matrix strip 46 with the clips 49 mounted thereon is sold to manufacturers of new tires or to retreading plants where the strip of clips are mounted within a mold cavity in the manner illustrated in Fig. 13. After the tire tread has been molded onto a tire casing, with the clips 49 imbedded within the tread, the matrix strip 46 is then manually stripped from the outer surface of the tread. Fig. 15 illustrates the appearance of the tread of a tire after the matrix strip 46 has been removed therefrom. Fig. 14 illustrates the manner in which the clips 49 are arranged in spaced parallel relation within the annular bead of a tire tread. In the manufacture of the matrix strip 46 and clips 49, it is contemplated that the ends of the legs 48 may be pressed through the thin material forming the strip 46. To prevent accidental displacement of the clips from the strip 46, the legs 48 of each clip may be adhesively united to the strip adjacent the apertures 47. In this form of the invention the matrix strip 46 serves to hold the clips 49 in predetermined spaced relation for shipment and storage to the users and also serves to maintain the clips 49 in proper position within a mold cavity during the molding operation. In this form of the invention it will also be noted that the ends of the clips 49 project beyond the outer surface of the tire tread for frictional engagement with a road surface.

While this invention has been shown in several forms, it is obvious to those skilled in the art that it is not so limited but is susceptible of various changes and modifications without departing from the spirit and scope of the claimed invention.

I claim as my invention:

1. In a pneumatic tire, an annular resilient rubber tread, a plurality of resilient metallic wire inserts embedded crosswise within said tread, said inserts having resilient arcuate arms projecting outwardly in spaced relation toward and terminating adjacent the outer surface of said tread, the outer surface of said tread being formed with a circumferentially extending concave recess disposed between the arms of said inserts.

2. In a pneumatic tire, an annular resilient rubber tread, a chain of connected resilient metallic wire inserts embedded crosswise within said tread, said inserts having resilient arcuate arms projecting outwardly in spaced relation toward and terminating adjacent the outer surface of said tread, the outer surface of said tread being formed with a circumferentially extending concave recess disposed between the arms of said inserts.

3. In a pneumatic tire, an annular resilient rubber tread, a plurality of metallic inserts embedded within said tread, said inserts having resilient arcuate arms projecting outwardly toward and terminating beyond the outer surface of said tread, the outer surface of said tread being formed with a continuous concave recess disposed between the arms of said inserts.

4. An article of manufacture for use in the molding of anti-skid treads on tires comprising, a strip of flexible material suitable for use as a matrix within a tire mold, and a plurality of generally U-shaped metallic inserts detachably secured in spaced relation along one side of said strip.

5. An article of manufacture for use in the molding of anti-skid treads on tires comprising, a strip of flexible material suitable for use as a matrix within a tire mold, and a plurality of generally U-shaped metallic inserts detachably secured in spaced relation along one side of said strip, the medial portion of said strip being concavo-convex in cross-section to form an annular concave recess within the tread of a tire.

6. An article of manufacture for use in the molding of anti-skid treads on tires comprising, a strip of flexible material suitable for use as a matrix within a tire mold, and a plurality of generally U-shaped metallic inserts having the ends of their legs detachably secured to said strip.

7. An article of manufacture for use in the molding of anti-skid treads on tires comprising, a strip of flexible material suitable for use as a matrix within a tire mold, and a plurality of generally U-shaped metallic inserts having the ends of their legs detachably secured to said strip, said inserts being disposed in spaced parallel relation.

8. An article of manufacture for use in the molding of anti-skid treads on tires comprising, a strip of flexible material suitable for use as a matrix within a tire mold, and a plurality of generally U-shaped metallic inserts having the ends of their legs detachably secured to said strip, said inserts being disposed in spaced parallel relation transversely of the strip.

9. An article of manufacture for use in the molding of anti-skid treads on tires comprising, a strip of flexible material suitable for use as a matrix within a tire mold, and a plurality of generally U-shaped metallic inserts having the ends of their legs detachably secured to said strip, said inserts being disposed in spaced parallel relation transversely of the strip, the ends of the legs of the metallic inserts being secured within apertures formed in said strip.

10. A mold for applying rib treads to pneumatic tires, said ribs having imbedded therein circumferentially-extended wire elements bent to provide connected parallel rows of spaced radially outwardly-projecting friction members, said mold comprising a plurality of radially inwardly-projecting endless parallel tread design-forming flanges, and an endless radially inwardly-projecting wire element-centering rib intermediate said flanges, said rib having a height less than said flanges and a width less than the space between said flanges.

11. In a pneumatic tire, an annular resilient rubber tread, a plurality of inserts formed of resilient metallic wire embedded transversely within said tread, each of said inserts being generally U-shape to provide a base and a pair of spaced legs projecting outwardly from the base and converging toward and terminating adjacent the outer surface of said tread, the outer surface of said tread being formed with a circumferentially extending recess disposed between the legs of said inserts.

12. In a pneumatic tire, an annular resilient rubber tread, a chain of connected inserts formed of resilient metallic wire embedded transversely within said tread, each of said inserts being generally U-shape to provide a base and a pair of spaced legs projecting outwardly from the base and converging toward and terminating adjacent the outer surface of said tread, the outer surface of said tread being formed with a circumferentially extending recess disposed between the legs of said inserts.

HAROLD E. KIMES.

References Cited in the file of this patent

UNITED STATES PATENTS

| Number | Name | Date |
|---|---|---|
| 135,415 | Estabrook | Feb. 4, 1873 |
| 1,161,191 | Cook | Nov. 23, 1915 |
| 1,740,616 | Midgley | Dec. 24, 1929 |
| 1,902,977 | Tamagno | Mar. 28, 1933 |
| 2,006,038 | Yamaki | June 25, 1935 |
| 2,120,502 | Morton | June 14, 1938 |
| 2,121,956 | Eger | June 28, 1938 |
| 2,381,395 | Brown | Aug. 7, 1945 |
| 2,479,474 | Crooker | Aug. 16, 1949 |